Jan. 31, 1961  W. L. MORRISON  2,969,649
METHOD OF SUPERCHILLING FROZEN FOOD
Filed Nov. 13, 1958  2 Sheets-Sheet 1
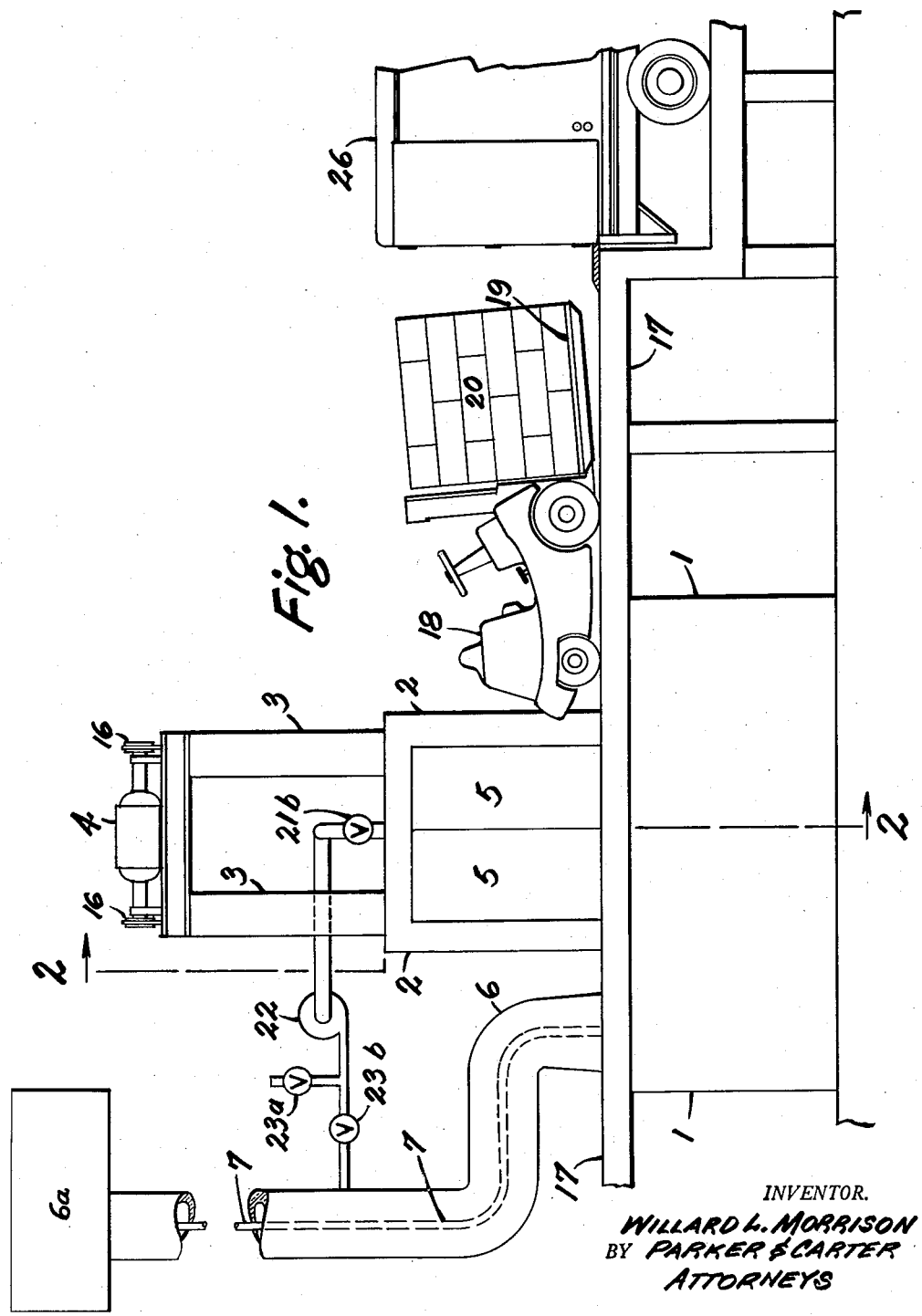
INVENTOR.
WILLARD L. MORRISON
BY PARKER & CARTER
ATTORNEYS

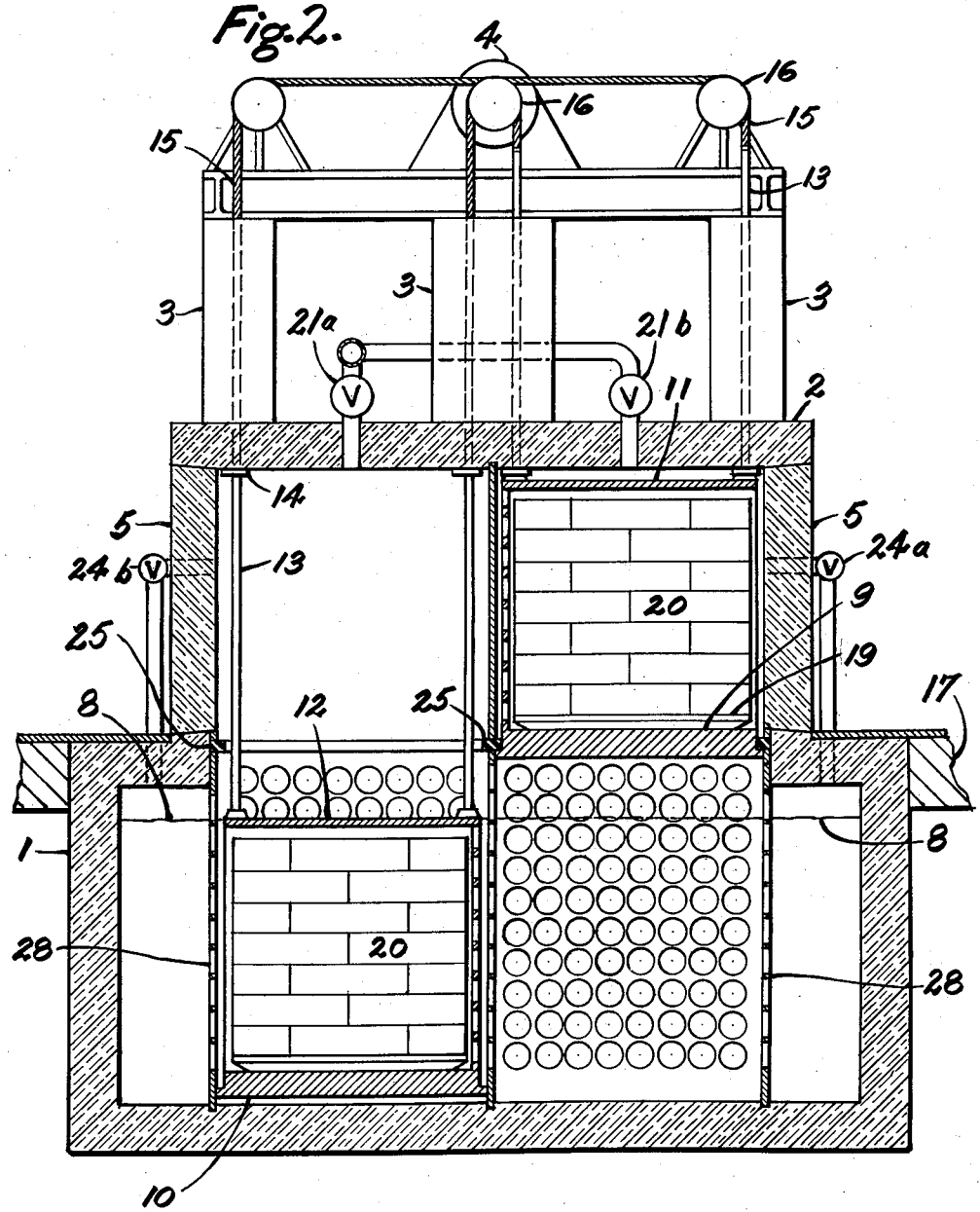

United States Patent Office 2,969,649
Patented Jan. 31, 1961

2,969,649

METHOD OF SUPERCHILLING FROZEN FOOD

Willard L. Morrison, Lake Forest, Ill., assignor, by mesne assignments, to Liquefreeze Company, Inc., New York, N.Y., a corporation of New York Filed Nov. 13, 1958, Ser. No. 773,772

12 Claims. (Cl. 62—64)

This invention relates to improvements in method of treating and shipping frozen food and has for one object to provide a method and apparatus for superchilling frozen food to temperatures far below those normally used in commerce and shipping such food for extended distances without any additional refrigeration.

Another object of the invention is to provide a method and apparatus for superchilling, packing and shipping of food with a minimum of manual manipulation.

I propose first to freeze the individual packages of food, each package being separately chilled down to a temperature at least zero degrees F., as has for a long time been common in the art. Then I propose to pack the packages of frozen food in liquid absorptive, liquid pervious cartons, of boxboard or the like so that the body of the carton not only absorbs liquid but facilitates and promotes liquid penetration through the walls thereof for contact with the packages. A plurality of the cartons will then be palletized, picked up by conventional type of fork lift truck and by the truck will be conveyed to and deposited in a vapor lock. All this will normally be done in the controlled refrigerated atmosphere of the conventional type of freezing plant.

Once the palletized body of cartons are in the vapor lock, the lock will be closed and the carton will be immersed in a bath of liquid nitrogen at substantially atmospheric pressure and substantially —320 degrees F., will stay there completely immersed for a predetermined length of time sufficient to insure that the cold liquid will penetrate the entire body, will saturate and pass through the walls of the carton, will contact and wet the outer surfaces of, and even may penetrate the food packages. Such immersion and contact will continue until all the packages have been cooled down to a selected low temperature far below zero degrees F.

When the selected far below zero temperature has been reached throughout the entire body of food, it will be withdrawn through a vapor lock, picked up by a lift truck and be deposited in an insulated shipper container which might well be an insulated freight car or insulated truck body.

No human hands touch or come in contact with the superchilled body of food because from the time the palletized carton is deposited in the gas lock for superchilling until the superchilled food is deposited in the shipper container, it is handled entirely in bulk by machinery, different types of machinery taking over in their order to accomplish this purpose.

The selected low temperature will be decided upon on the basis of the rate of heat flow through the insulation, the expected time of travel and the conditions to which the shipment will be exposed so that the insulated shipment will arrive at destination, without further refrigeration, at a safe low temperature.

Since the body of palletized cartons will be withdrawn immediately from the bath, the cartons and the packages will still be wet with the liquid. This liquid will evaporate during movement to and loading in the shipper container and will protect the mass against excessive loss of heat during such time. When the shipper container is loaded with the palletized cartons and there may be one or more pallets, ambient air will be excluded and the container will then be shipped to destination. The contents will be subjected to the usual rise of temperature as a result of heat inflow through the insulation but if the selected starting temperature is low enough, heat inflow will be unable to raise the temperature to or above the danger point.

The reason for inserting the palletized cartons into the bath through vapor locks is to minimize waste of nitrogen and pollution of the nitrogen by air and permit purification and reliquefaction of the gas boiled off from the liquid by the heat of the food. When the cartons are immersed in the liquid bath, immediate boiling of the liquid in contact with the food occurs and expansion from liquid to gas in the order of six hundred times is violent so the bath must be in a closed chamber from which the air may be excluded to avoid pollution and within which the gas and liquid must be contained so that the gas may be reliquefied.

One or more carton loaded pallets will be placed in a vapor lock. The lock will be closed and air will be exhausted therefrom. The lock will then be connected to the nitrogen system and gaseous nitrogen will rush in to replace the air though since an absolute vacuum cannot be obtained, there will be some pollution of the nitrogen by air.

Once pressure between the lock and the bath chamber is equalized, the loaded pallet or pallets will be immersed in the liquid bath with, as above indicated, violent evaporation which continues until the food in the cartons on the pallet has been reduced to the selected far below zero temperature. Then the pallets will be raised, dripping with liquid from the bath, into the same or a different vapor lock. The lock will then be exhausted of gaseous nitrogen which is returned to the system. Air will be admitted and the lock will be open. A fork lift truck will pick up the pallet or pallets and load them into the refrigerator car so that the only handling of the liquid frozen material will be by the fork lift truck during the short time it takes to move from the vapor lock to and deposit the pallets in the car.

Other objects will appear from time to time throughout the specification and claims.

My invention is illustrated more or less diagrammatically in the accompanying drawings, wherein:

Figure 1 is a schematic elevation of the apparatus;

Figure 2 is a section on an enlarged scale along the line 2—2 of Figure 1.

Like parts are indicated by like characters throughout the specification and drawings.

The bath housing 1 has above and in communication with it the multi-chamber gas lock 2. Columns 3 project upwardly from the gas lock to support a hoisting motor 4. A door 5 can open or close each of the gas lock chambers and those chambers are open at the bottom to communicate with the bath housing 1. An insulated gas discharge duct 6 communicates with the bath chamber. A liquid supply duct 7 preferably enclosed in the duct 6 discharges into the chamber. The chamber contains a bath of liquid nitrogen at substantially atmospheric pressure, the level of the bath being indicated at 8.

The liquid nitrogen at atmospheric pressure is a very cold coolant at approximately —320 degrees F. and as it does its work, gaseous nitrogen is boiled out of the bath, discharged through the duct 6 to a suitable reliquefaction plant where the nitrogen is reliquefied and returned as liquid nitrogen at substantially atmospheric pressure to the bath. The details of the reliquefaction apparatus forming no part of the present invention are not illustrated.

Each of the lock chambers contains an elevator, the elevators having platforms 9 and 10 carried respectively by elevator frames 11 and 12 which in turn are suspended on tension rods 13 which travel in packing sleeves 14 and are carried by hoisting chains or cables 15 wound about pulleys 16 actuated by the motor 4. The elevators counterbalance one another so that when one is in a lock chamber, the other will be immersed in the bath. An operating floor 17 is above the bath chamber on a level with whichever one of the elevator floors 9 and 10 is in the upper position. A fork lift truck 18 is adapted to handle pallets 19 on which are palletized bodies of cartons 20 for freezing. These cartons usually consist of paperboard or fiber or other liquid pervious material and usually each contains a plurality of separately frozen packages of food. Each pallet holds a mass of cartons adapted to substantially fill the space in the lock chamber and be supported by the elevator floor 9 or 10 as the case may be.

The lift truck will pick up a palletized mass of frozen food cartons and the door of one of the locks being open and the elevator floor on a level with the platform will deposit the palletized body of cartons in the lock on the elevator. The door 5 will then be closed. The valve 21a will be closed, the valve 21b will be open. The pump 22 will draw a vacuum on the lock chamber which has just been filled and discharge the air through the valve 23a to atmosphere, the valve 23b being closed. Valve 24a will then be opened to allow gaseous nitrogen from the bath chamber to enter the lock chamber and equalize the pressure so that the elevator floor 9 may be lowered, the packings 25 inhibiting gas flow between the bath and lock chamber when the elevator floor is in the upper position. The motor 4 will then be operated to lower the elevator floor 9 and raise the elevator floor 10, thus immersing the contents of the elevator 9 in the bath and withdrawing the contents of elevator 10 therefrom, the valve 24a during all that time being open so that there will be no pressure differential between the bath and the lock chamber.

When the two elevator platforms have reversed their position and platform 10 is now on a level with the working platform 17, the valve 24a will be closed, the opening between the left hand lock chamber and the bath will be closed by the elevator floor and the packing 25. Valve 21b will be closed, valve 21a will be opened. Valve 23a will be closed and valve 23b will be opened. The pump 22 will then be operated to draw gaseous nitrogen out of the lock chamber and discharge it into the pipe 6. This will continue until a proper vacuum has been achieved at which time valve 23b will be closed, valve 23a will be opened and air will be allowed to travel back through the pump to bring the pressure in the gas lock up to atmospheric at which time the gate 5 may be opened and the fork lift truck will pick up the load and deposit it in the shipper container illustrated in this case as an insulated truck 26.

The foraminous cages 28 are generally co-extensive with and below the vapor lock to prevent the danger that any of the cartons might fall off the pallet while in the immersed condition.

A reliquefying means is disclosed at 6a which receives gas through the duct 6 and returns the liquid to the concentric duct 7.

The use and operation of my invention are as follows:

Separate food packages are frozen in the usual manner in the air tunnel or other conventional food freezing means. A plurality of these packages are then packed by hand in a suitable porous or liquid pervious carton. These packages are at temperatures in the order of zero. The cartons are then stacked or palletized on a pallet still at approximately the starting temperature. The pallet is then picked up by a fork lift truck and deposited in one of the gas lock chambers. The loaded pallet is then immersed in the liquid bath with rapid evaporation or boiling of the liquid as a result of the heat of the food, the heat in the order of zero degrees F. being far above the —320 degrees F. temperature of the liquid nitrogen. Meanwhile, the companion pallet which was previously immersed will have been drawn out of the bath, the vapor lock will be open, the fork lift truck will pick up the cold pallet and deposit it in the shipper container, no handling, no touching being involved.

The only thing that touches the cold carton between its removal from the bath and its deposit in the shipper container is the fork lift truck itself so men do not have to work in a cold atmosphere, do not have to wear special clothing and do not touch or handle the foodstuff from the time it is palletized until it is deposited in the shipper container.

It is important that little if any air or oxygen be found in the liquid bath. Hence the necessity of first drawing a vacuum in the lock chamber before the chamber is put into communication with the bath chamber so that a minimum of air will be left in the lock chamber to contaminate the nitrogen. It is important that little if any nitrogen be wasted, hence the importance of drawing a vacuum on the lock chamber while it has nitrogen in it so as to return to the nitrogen liquefaction plant the greatest possible proportion of the nitrogen.

The details of liquefaction and apparatus for purging air and oxygen from the nitrogen form no part of the present invention.

It is important that complete immersion and complete wetting of every single food package on every side occur and this can only be sure of occurring when each package is immersed in the liquid bath. When that is the case, the hydrostatic pressure will insure that the liquid penetrates, even though boiling, into all of the spaces around all the packages so that they may all be lowered to the desired selected low temperature to insure that the water of composition of the food is all of it lowered to that desired temperature.

I claim:

1. The method of cooling food which consists in placing an assembled body of individual food packages in a gas lock under atmospheric pressure, drawing a vacuum in and then admitting nitrogen in gaseous phase into the zone to replace the air exhausted therefrom, connecting the gas lock with a bath chamber under atmospheric pressure, removing the body as a unit from the gas lock and immersing it in a bath of liquid nitrogen in the bath chamber, holding the body below the level of the liquid in the bath until all the surfaces of the food packages are wet with the liquid and the water of composition of the food has been reduced to a selected far below zero temperature, thereafter returning the body as a unit to a gas lock in the presence of nitrogen under atmospheric pressure in gaseous phase, disconnecting the gas lock from the bath chamber, withdrawing the gaseous nitrogen from the gas lock, admitting air thereto to replace the nitrogen, opening the gas lock and removing the body as a unit therefrom.

2. The method of cooling food which consists in placing an assembled body of individual, previously frozen food packages in a gas lock under atmospheric pressure, drawing a vacuum in and then admitting nitrogen in gaseous phase into the zone to replace the air exhausted therefrom, connecting the gas lock with a bath chamber under atmospheric pressure, removing the body as a unit from the gas lock and immersing it in a bath of liquid nitrogen in the bath chamber, holding the body below the level of the liquid in the bath until all the surfaces of the food packages are wet with the liquid and the water of composition of the food has been reduced to a selected temperature far below the initial frozen food temperature, thereafter returning the body as a unit to a gas lock in the presence of nitrogen under atmospheric pressure in gaseous phase, disconnecting the gas lock from the bath chamber, withdrawing the gaseous nitrogen from the gas lock, admitting air thereto to replace the nitrogen, opening the gas lock and removing the body as a unit therefrom, recovering the nitrogen boiled from the bath by the heat of the food, reliquefying it and returning it to the bath.

3. The method of cooling food which consists in placing an assembled body of individual, previously frozen food packages in a gas lock under atmospheric pressure, drawing a vacuum in and then admitting nitrogen in gaseous phase into the zone to replace the air exhausted therefrom, connecting the gas lock with a bath chamber under atmospheric pressure, removing the body as a unit from the gas lock and immersing it in a bath of liquid nitrogen in the bath chamber, holding the body below the level of the liquid in the bath until all the surfaces of the food packages are wet with the liquid and the water of composition of the food has been reduced to a selected temperature far below the initial frozen food temperature, thereafter returning the body as a unit to a gas lock in the presence of nitrogen under atmospheric pressure in gaseous phase, disconnecting the gas lock from the bath chamber, withdrawing the gaseous nitrogen from the gas lock, admitting air thereto to replace the nitrogen, opening the gas lock and removing the body as a unit therefrom, recovering the nitrogen withdrawn from the gas lock, reliquefying it and returning it to the bath.

4. In combination, a bath chamber, a bath of liquid nitrogen at atmospheric pressure therein, there being clearance above the liquid for gaseous nitrogen, a gas lock chamber open to atmosphere and to the bath chamber, removable closures for said openings, means for exhausting air from the closed gas lock chamber and for thereafter equalizing the pressure between the two chambers by admission of gaseous nitrogen from the bath chamber to the lock chamber, means for thereafter opening a passage between the chambers, and for moving an assembled mass of separate food packages from the lock chamber to and immersing it as a unit in the bath, means for removing the mass from the bath to a gas lock chamber and for closing the connection between the two chambers, means for withdrawing gaseous nitrogen from the lock chamber, for reliquefaction and returning to the bath chamber, means for admitting air to the lock chamber to replace the gas and equalize the pressure with atmosphere and means for opening the lock chamber and removing the food mass therefrom.

5. In combination, a bath chamber, a bath of liquid nitrogen at atmospheric pressure therein, there being clearance above the liquid for gaseous nitrogen, a gas lock chamber open to atmosphere and to the bath chamber, removable closures for said openings, means for exhausting air from the closed gas lock chamber and for thereafter equalizing the pressure between the two chambers by admission of gaseous nitrogen from the bath chamber to the lock chamber, means for thereafter opening a passage between the chambers, and for moving an assembled mass of separate food packages from the lock chamber to and immersing it as a unit in the bath, means for removing the mass from the bath to a gas lock chamber and for closing the connection between the two chambers, means for withdrawing gaseous nitrogen from the lock chamber, for reliquefaction and return to the bath chamber, means for admitting air to the lock chamber to replace the gas and equalize the pressure with atmosphere and means for opening the lock chamber and removing the food mass therefrom, means for withdrawing gaseous nitrogen from the bath chamber, reliquefying it and returning it to the bath.

6. In combination, a bath chamber, a bath of liquid nitrogen at atmospheric pressure therein, there being clearance above the liquid for gaseous nitrogen, a gas lock chamber open to atmosphere and to the bath chamber, removable closures for said openings, means for exhausting air from the closed gas lock chamber and for thereafter equalizing the pressure between the two chambers by admission of gaseous nitrogen from the bath chamber to the lock chamber, means for thereafter opening a passage between the chambers, and for moving an assembled mass of separate food packages from the lock chamber to and immersing it as a unit in the bath, means for removing the mass from the bath to a gas lock chamber and for closing the connection between the two chambers, means for withdrawing gaseous nitrogen from the lock chamber, for reliquefaction and returning to the bath chamber, means for admitting air to the lock chamber to replace the gas and equalize the pressure with atmosphere and means for opening the lock chamber and removing the food mass therefrom, means for reliquefying the gaseous nitrogen withdrawn from the gas lock chamber and returning it to the bath.

7. In combination, a bath chamber, a bath of liquid nitrogen at atmospheric pressure therein, there being clearance above the liquid for gaseous nitrogen, a gas lock chamber open to atmosphere and to the bath chamber, removable closures for said openings, means for exhausting air from the closed gas lock chamber and for thereafter equalizing the pressure between the two chambers by admission of gaseous nitrogen from the bath chamber to the lock chamber, means for thereafter opening a passage between the chambers, and for moving an assembled mass of separate food packages from the lock chamber to and immersing it as a unit in the bath, means for removing the mass from the bath to a gas lock chamber and for closing the connection between the two chambers, means for withdrawing gaseous nitrogen from the lock chamber, for reliquefaction and returning to the bath chamber, means for admitting air to the lock chamber to replace the gas and equalize the pressure with atmosphere and means for opening the lock chamber and removing the food mass therefrom, means for withdrawing gaseous nitrogen from the bath chamber for reliquefying such gas together with the gas drawn from the gas lock chamber and returning the liquid to the bath.

8. A closed bath chamber, a bath of liquid nitrogen at atmospheric pressure therein, a gas lock chamber above and communicating with the bath chamber, an elevator platform and means for moving it up and down between the two chambers, a seal at the upper limit of the excursion of the platform forming with the latter a sealed closure between the two chambers, the lock chamber being ported to atmosphere and means for opening and closing the port, means for drawing a vacuum on the closed lock chamber and means for admitting gaseous nitrogen from the bath chamber to the lock chamber to equalize the pressure therein.

9. A closed bath chamber, a bath of liquid nitrogen at atmospheric pressure therein, a gas lock chamber above and communicating with the bath chamber, an elevator platform and means for moving it up and down between the two chambers, a seal at the upper limit of the excursion of the platform forming with the latter a sealed closure between the two chambers, the lock chamber being ported to atmosphere and means for opening and closing the port, means for withdrawing gaseous nitrogen from the lock chamber, reliquefying it and returning it to the bath.

10. Means for cooling food to temperatures far below zero including a gas tight bath chamber containing a bath of liquid nitrogen at atmospheric pressure, a ported gas lock chamber in register therewith above the level of the liquid, means for opening and closing the port, an elevator platform, means for moving it up and down between the chambers to open and close the communication therebetween, packing means in the path of the platform adapted to be contacted by the platform at the upper end of its excursion to provide a seal between the two chambers, the means for lowering the platform being adapted to immerse it and its contents in the bath, means for exhausting air from the lock chamber, a separate valved connection between the chambers adapted to equalize the pressure therein.

11. Means for cooling food to temperatures far below zero including a gas tight bath chamber containing a bath of liquid nitrogen at atmospheric pressure, a ported gas lock chamber in register therewith above the level of the liquid, means for opening and closing the port, an elevator platform, means for moving it up and down between the chambers to open and close the communication therebetween, packing means in the path of the platform adapted to be contacted by the platform at the upper end of its excursion to provide a seal between the two chambers, the means for lowering the platform being adapted to immerse it and its contents in the bath, means for exhausting air from the lock chamber, a separate valved connection between the chambers adapted to equalize the pressure therein, means for exhausting gas from the lock chamber, and separate valved gas connecting means between the lock chamber and atmosphere.

12. Means for cooling food to temperatures far below zero including a gas tight bath chamber containing a bath of liquid nitrogen at atmospheric pressure, a ported gas lock chamber in register therewith above the level of the liquid, means for opening and closing the port, an elevator platform, means for moving it up and down between the chambers to open and close the communication therebetween, packing means in the path of the platform adapted to be contacted by the platform at the upper end of its excursion to provide a seal between the two chambers, the means for lowering the platform being adapted to immerse it and its contents in the bath, means for exhausting air from the lock chamber, a separate valved connection between the chambers adapted to equalize the pressure therein, means for exhausting gas from the lock chamber, and separate valved gas connecting means between the lock chamber and atmosphere, means for reliquefying the nitrogen gas exhausted from the lock chamber and returning it to the bath chamber.

References Cited in the file of this patent
UNITED STATES PATENTS

| | | |
|---|---|---|
| 122,799 | Blaisdell | Jan. 16, 1872 |
| 231,369 | Stewart | Aug. 17, 1880 |
| 1,453,279 | Luhrmann | May 1, 1923 |
| 2,137,902 | Walter | Nov. 22, 1938 |
| 2,502,527 | McFarlan | Apr. 4, 1950 |